United States Patent
Zhang et al.

(10) Patent No.: US 11,465,510 B2
(45) Date of Patent: Oct. 11, 2022

(54) MAGNETIC SUSPENSION BOGIE AND TRAIN

(71) Applicant: CRRC TANGSHAN CO., LTD., Hebei (CN)

(72) Inventors: Xiaojun Zhang, Tangshan (CN); Wenhao Hu, Tangshan (CN); Yujiang Li, Tangshan (CN); Shuo Zhang, Tangshan (CN); Rujia Jiang, Tangshan (CN); Zaifei Gong, Tangshan (CN); Guangying Wang, Tangshan (CN); Bo Wang, Tangshan (CN)

(73) Assignee: CRRC TANGSHAN CO., LTD., Hebei (CN)

(*) Notice: Subject to any disclaimer, the term of this patent is extended or adjusted under 35 U.S.C. 154(b) by 387 days.

(21) Appl. No.: 16/627,333

(22) PCT Filed: May 9, 2018

(86) PCT No.: PCT/CN2018/086199
§ 371 (c)(1),
(2) Date: Dec. 29, 2019

(87) PCT Pub. No.: WO2019/184055
PCT Pub. Date: Oct. 3, 2019

(65) Prior Publication Data
US 2020/0164751 A1  May 28, 2020

(30) Foreign Application Priority Data
Mar. 27, 2018 (CN) .......................... 201810256170.4

(51) Int. Cl.
*B60L 13/04* (2006.01)
*B61F 5/52* (2006.01)

(52) U.S. Cl.
CPC ................ *B60L 13/04* (2013.01); *B61F 5/52* (2013.01)

(58) Field of Classification Search
CPC .. B60L 13/04; B60L 13/10; B61F 5/52; B61F 5/50; B61F 5/16; B61F 1/14; B61F 5/00; B61F 5/10; B61F 5/24; B61B 13/08
See application file for complete search history.

(56) References Cited

U.S. PATENT DOCUMENTS

| | | | | |
|---|---|---|---|---|
| D123,225 | S | * 10/1940 | Hyde | .............................. D12/40 |
| 3,216,370 | A | * 11/1965 | Kulieke | ................... B61G 5/02 |
| | | | | 105/4.1 |

(Continued)

FOREIGN PATENT DOCUMENTS

| | | |
|---|---|---|
| CN | 1408593 A | 4/2003 |
| CN | 102019938 A | 4/2011 |

(Continued)

OTHER PUBLICATIONS

Wood Joints, Tools and Workshop—Bob Vila (Year: 2013).*
(Continued)

*Primary Examiner* — Mark T Le
(74) *Attorney, Agent, or Firm* — Syncoda LLC; Feng Ma

(57) ABSTRACT

A magnetic suspension bogie, the bogie comprising a upper frame located at the upper portion, two lower frames located at the lower portion, a suspension device and a track sensing device, wherein the upper frame and the lower frames are hinged and connected by means of a connecting device. By means of using a bearing hinge structure to connect the upper frame and the lower frames, it is not necessary to specially provide a separate steering mechanism; thus, a plurality of functions are comprised, while the structure is at the same time simplified. The present invention also relates to is a magnetic suspension train.

19 Claims, 12 Drawing Sheets

(56) References Cited

U.S. PATENT DOCUMENTS

| | | | | | |
|---|---|---|---|---|---|
| 3,842,750 | A | * | 10/1974 | Miericke | B61B 13/08 104/285 |
| 4,088,080 | A | * | 5/1978 | Jackson | B61F 3/06 105/199.1 |
| 4,164,188 | A | * | 8/1979 | Hallam | B61F 5/24 105/166 |
| 4,676,173 | A | * | 6/1987 | Mielcarek | B61F 5/24 105/182.1 |
| 4,793,720 | A | * | 12/1988 | Merker, Jr. | B61F 5/142 384/220 |
| 4,794,866 | A | * | 1/1989 | Brandis | B61B 13/12 104/294 |
| 4,838,172 | A | * | 6/1989 | Morishita | B65G 54/02 104/284 |
| 9,915,035 | B1 | * | 3/2018 | Van Rosendale | E01B 25/305 |

FOREIGN PATENT DOCUMENTS

| | | |
|---|---|---|
| CN | 102101446 A | 6/2011 |
| CN | 102114790 A | 7/2011 |
| CN | 203902569 U | 10/2014 |
| CN | 105150875 A | 12/2015 |
| CN | 106347168 A | 1/2017 |
| CN | 206297425 U | 7/2017 |
| CN | 110304089 A | 10/2019 |
| DE | 4322074 A1 | 1/1995 |
| JP | 6-8823 * | 6/1992 |
| JP | H058725 A | 1/1993 |
| JP | H06237505 A | 8/1994 |
| JP | H06316263 A | 11/1994 |
| JP | H11234810 A | 8/1999 |

OTHER PUBLICATIONS

English translation of the Written Opinion of the International Search Authority in the international application No. PCT/CN2018/086199, dated Nov. 29, 2018.

Supplementary European Search Report in the European application No. 18911601.5, dated Apr. 21, 2021.

International Search Report in the international application No. PCT/CN2018/086199, dated Nov. 29, 2018.

* cited by examiner

MAGNETIC SUSPENSION BOGIE AND TRAIN

CROSS-REFERENCE TO RELATED APPLICATIONS

This application is a 35 U.S.C. 371 national stage filing of International Application No. PCT/CN2018/086199 filed May 9, 2018, which claims priority to Chinese Patent Application No. 201810256170.4 filed Mar. 27, 2018. The entire contents of these above patent applications are hereby incorporated by reference in their entirety.

TECHNICAL FIELD

The present application relates to the field of rail transit, in particular to a magnetic suspension bogie and a train.

BACKGROUND

At present, magnetic suspension trains can be divided into Electro Magnetic Suspension (EMS) and Electro Dynamic Suspension (EDS) according to different suspension modes. The EMS suspends the car by means of attraction generated by common-conducting electromagnets (suspension electromagnets) mounted on the bogies at two sides of a car and magnets laid on a line guide rail in magnetic field. The EDS mounts superconducting magnets at a bottom of the train (placed in a liquid nitrogen or liquid helium storage container) and lays a series of aluminum ring coils at two sides of a rail. When a train runs, the coil (the superconducting magnet) on the car is powered on to generate a strong magnetic field; the coil (the aluminum ring) on ground is tangent to the coil on the car, and a direction of magnetic field generated by the coil (the aluminum ring) on ground is contrary to that of the superconducting magnet on the car, and the two magnetic fields generate a repulsive force. When the repulsive force is greater than the weight of the car, the car is suspended. Therefore, the EDS generates a suspension force by means of a relative movement between the superconducting magnet placed on the car and the passive coil laid on the rail.

No matter which suspension mode, three main systems, namely a suspension system, a drive system and a guide system, of the magnetic suspension train are generally provided in a walking mechanism under the car. Therefore, the design of a reasonable walking mechanism plays a key role of implementing the basic functions of suspension, drive and guide of the magnetic suspension train, and ensuring the safety and comfort.

At present, for the common-conducting magnetic suspension train, a comparatively mature and unified walking mechanism mode has been formed, that is, a walking mechanism mostly consists of "two suspension modules at left and right and two pairs of beams for preventing side rolling" or "two suspension modules at left and right, a central traction motor and two pairs of beams for preventing side rolling", and has a secondary suspension system and a forced-steering mechanism as an auxiliary. However, for the superconducting magnetic suspension train, because its suspension principle is different from that of the common-conducting magnetic suspension train, it is needed to hang a plurality of devices for containing low-temperature cooling liquid, which increases the weight of the walking mechanism. From the perspective of lightening and improving suspension efficiency, it is considered to research and develop a walking mechanism, which has three main functions of suspension, drive and guide, and the structure of which should be simplified as much as possible, aiming at the superconducting magnetic suspension car.

SUMMARY

In view of this, embodiments of the present application are intended to provide a magnetic suspension bogie, so as to solve at least one technical problem in the related art.

To this end, the technical solutions of the embodiments of the present application are implemented as follows. A magnetic suspension bogie is provided. The bogie includes an upper frame located at an upper portion, two lower frames located at a lower portion, a suspension device and a track sensing device. The upper frame and the lower frames are hinged and connected by means of a connecting device. Suspension devices are mounted at bottoms of two sides of the lower frame. A track sensing device is mounted at a bottom surface of a middle of the lower frame.

On the basis of the above technical solutions, the present application may also make the following improvements.

In an embodiment, the two lower frames are arranged in parallel. A front end and a rear end of the upper frame are respectively mounted on corresponding lower frame by means of the connection device.

In an embodiment, a mounting hole slot is formed in a middle of the upper frame. The mounting hole slot is configured to mount a traction mechanism. The traction mechanism is configured to connect a magnetic suspension train body and the magnetic suspension bogie. Two sides of the upper frame respectively extend outward to form a mounting part, on which an air spring mounting seat is provided.

In an embodiment, steering stoppers are respectively provided on two ends of the upper frame. A steering stopper base is provided at a position, corresponding to the steering stopper, of the lower frame. The steering stopper base is configured to limit lateral displacement of the steering stopper.

In an embodiment, the lower frame includes a beam and two side beams which are symmetrically provided at two sides of the beam. The suspension device is provided at a bottom of the side beam. The track sensing device is provided on a bottom surface of a middle of the beam.

In an embodiment, guide devices are respectively provided at bottoms of two sides of the beam. The guide device includes a guide wheel which is laterally provided and a guide wheel carrier. The guide wheel is mounted on the beam by means of the guide wheel carrier; and the guide wheel comes into contact with an inner wall of a track.

In an embodiment, support devices are respectively provided at bottoms of two sides of the beam. The support device corresponds to a top surface of a track, and is configured to support the bogie when the bogie is in a non-suspension state.

In an embodiment, the connection device is provided in the middle of the beam. Wearing plates are respectively provided at two sides of the connection device on the beam. A contact side bearing set is provided at a position, corresponding to the wearing plate, on a bottom surface of the upper frame. The contact side bearing set is configured to support the upper frame.

In an embodiment, the contact side bearing set includes a steering friction block and a steering friction block mounting base. The steering friction block mounting base is mounted on the upper frame, and the steering friction block is mounted on the steering friction block mounting base.

In an embodiment, the connection device is a bearing hinge device. The bearing hinge device includes a bearing set, a main shaft and a shaft baffle. The main shaft is provided vertically. The bearing set is provided on a top of the main shaft. A bottom of the main shaft is mounted on the lower frame. A bearing set mounting hole for mounting the bearing set is provided at a position, corresponding to the bearing hinge device, on a bottom of the upper frame. The shaft baffle is sleeved on the main shaft. The shaft baffle is mounted on the upper frame by means of a fixing piece.

In an embodiment, the suspension device includes a container, low-temperature cooling liquid and a superconducting block. The low-temperature cooling liquid and the superconducting block are provided in the low-temperature material container. The container is mounted on bottom surfaces at two sides of the lower frame.

In an embodiment, an anti-yaw damper is mounted between the upper frame and the lower frame.

In an embodiment, a vertical damping device and a lateral damping device are provided between the upper frame and the lower frame.

Compared with the traditional art, the present application also provides a magnetic suspension train, so as to solve at least one technical problem in the related art.

The technical solutions of the present application for solving the above technical problem are as follows. A magnetic suspension train is provided. The train includes a plurality of compartments and a bogie. The bogie is mounted at a bottom of the compartment.

To sum up, the present application has the beneficial effects as follows: the magnetic suspension bogie of the present application has basic functions of suspension drive and guidance of a magnetic suspension car; by using a bearing hinge structure to connect the upper frame and the lower frames, it is not necessary to specifically provide a separate steering mechanism, which simplifies the structure while providing a plurality of functions; because there are a few parts, and the parts are made of light material, the weight of a walking mechanism of a superconducting magnetic suspension car can be reduced effectively; and a low-temperature liquid filling system is usually arranged on the ground under the car, thus it is beneficial to mounting a larger number of low-temperate containers in the walking mechanism and bogie to contain more low-temperature liquid, and then more suspension force can be realized.

By arranging a track sensing device traction motor on a track under the car, the weight of the walking mechanism is reduced, and it is easy to extend a design scope of the power of the traction motor, so that the magnetic suspension car running at a higher speed (above 500 km/h) can be realized.

BRIEF DESCRIPTION OF DRAWINGS

The accompanying drawings described here are used for providing further understanding of the present application, and constitute a part of the present application. Schematic embodiments of the present application and description thereof are used for illustrating the present application and not intended to form an improper limit to the present application. In the accompanying drawings.

Figure 1:
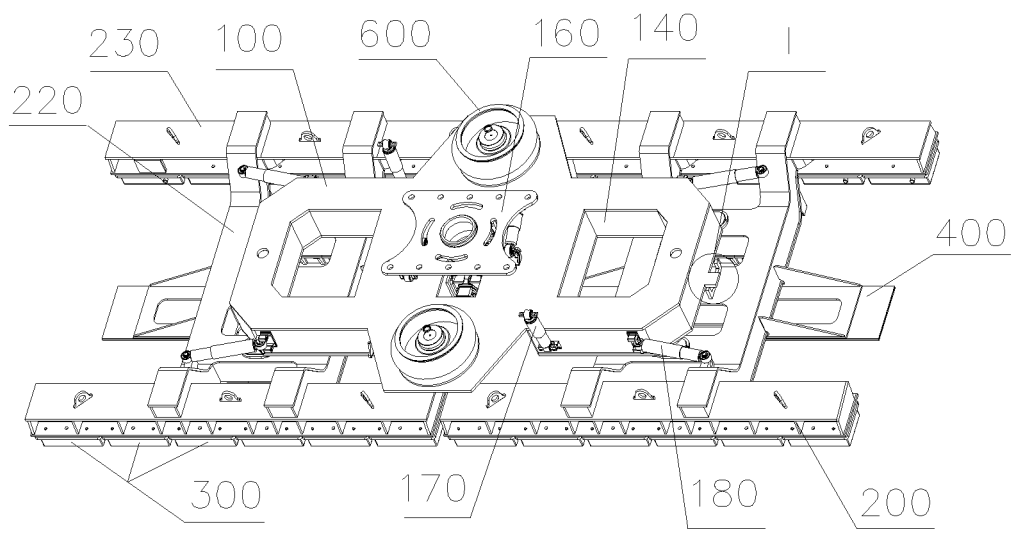
FIG. 1 is a scale drawing of a bogie in the embodiments of the present application.

In the drawings, a list of parts represented by labels is as follows: 100. upper frame; 110. bearing set mounting hole; 120. mounting hole slot; 130. mounting part; 131. air spring mounting base; 140. weight reducing hole slot; 150. steering stopper; 160. traction mechanism; 170. vertical damping device; 180. lateral damping device; 190. contact side bearing set; 191. steering friction block; 192; friction block mounting base; 200. lower frame; 210. steering stopper base; 211. baffle; 220. beam; 221. lap joint part; 222. wearing plate; 223. wearing plate mounting base; 230. side beam; 231. cowcatcher; 240. anti-yaw bogie; 300. suspension device; 400. track sensing device; 500. connection device; 510. bearing set; 520. main shaft; 600. air spring; 700. guide device; 710. guide wheel; 720. guide wheel carrier; 800. support device; 810. support wheel; 820. support wheel carrier; 830. vertical skid; 840. skid bracket; 900. track; 910. support top surface; 920. suspension top surface.

DETAILED DESCRIPTION

In order to make the technical solutions and advantages in embodiments of the present application clearer, the exemplary embodiments in the present application are further elaborated below in combination with the accompanying drawings. It is apparent that the described embodiments are only a part of the embodiments of the present application but are not exhaustive of all the embodiments. It is to be noted that the embodiments in the present application and the characteristics in the embodiments may be combined under the condition of no conflicts.

As illustrated in the FIGS. 1 to 12, the present application provides a magnetic suspension bogie. The bogie includes an upper frame 100 located at the upper portion, two lower frames 200 located at the lower portion, a suspension device 300 and a track sensing device 400. The upper frame 100 and the lower frames 200 are hinged and connected by means of a connecting device 500. Suspension devices 300 are mounted at bottoms of two sides of the lower frame 200. A track sensing device 400 is mounted at the bottom surface of the middle of the lower frame 200.

The present application provides a magnetic suspension bogie with a double-layer hinge structure aiming at the problem that a suspension efficiency is influenced because a lot of low-temperature cooling liquid containers are hung under a car of a superconducting magnetic suspension train, which increases the weight of the car, and in combination with the principle characteristic that the superconducting magnetic suspension train generates a suspension force by means of a magnetic repulsive force. The structure has basic functions of suspension, drive and guide, and may implement auxiliary functions of bearing, steering, vibration absorbing, landing and parking, and running.

Figure 3:
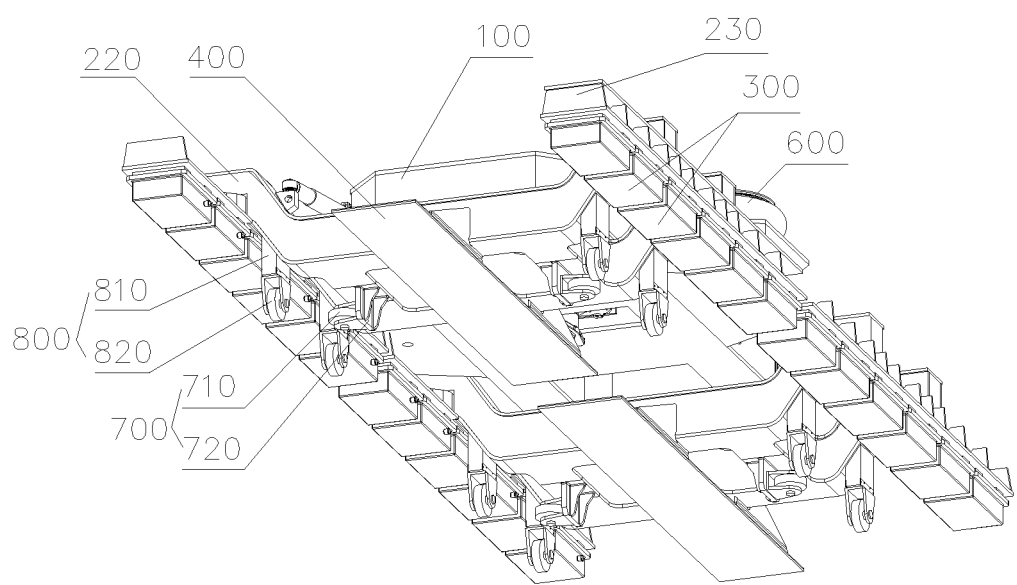
FIG. 3 is a scale drawing of a bottom view in the present application.

In some embodiments of the present application, as illustrated in FIG. 3, two lower frames 200 are arranged in parallel. Front end and rear end of the upper frame 100 are mounted on the corresponding lower frame 200 by means of the connection device 500 respectively.

Figure 11:
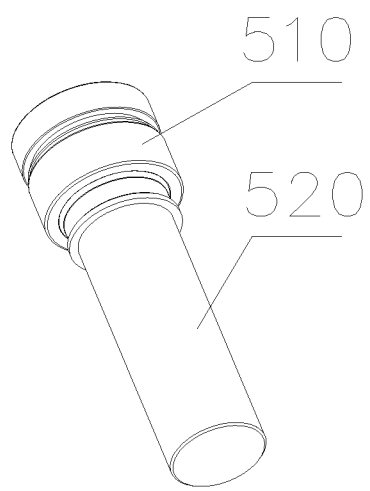
FIG. 11 is a scale drawing of a connection device in the present application.

As illustrated in FIG. 11, the connection device 500 is a bearing hinge device. The bearing hinge device includes a bearing set 510, a main shaft 520 and a shaft baffle (not marked in the drawings). The main shaft 520 is provided vertically. The bearing set 510 is provided on the top of the main shaft 520. Specifically, the top of the main shaft 520 is fixedly connected with an inner ring of the bearing set 510. The bottom of the main shaft 520 is mounted on the lower frame 200. A bearing set 510 mounting hole used for mounting the bearing set 510 is provided at the position, corresponding to the bearing hinge device, on the bottom of the upper frame 100. An outer ring of the bearing set 510 is fixed in the bearing set mounting hole 110. The shaft baffle is sleeved on the main shaft 520. The shaft baffle is mounted on the upper frame 100 by means of a fixing piece. The fixing piece here can be a bolt and a screw, which is not limited by the present application.

The suspension device 300 provides a suspension force for the bogie. The suspension device 300 includes a container (not marked in the drawings), a low-temperature cooling liquid (not marked in the drawings) and a superconducting block (not marked in the drawings). The low-temperature cooling liquid and the superconducting block are provided in the low-temperature material container. The container is mounted on the bottom surfaces at two sides of the lower frame 200. The container is a Dewar type container. By using the Dewar type container to contain the low-temperature cooling liquid and the superconducting block, a magnetic repulsion force is generated between the bogie and the track 900 surface to ensure the car suspension.

As illustrated in FIG. 1, a vertical damping device 170 and a lateral damping device 180 are provided between the upper frame 100 and the lower frame 200, providing a vertical damping effect and a lateral damping effect between the upper frame 100 and the lower frame 200.

Specifically, the vertical damping device 170 can be selected from a vertical damper, a vertical hydraulic damper, and other devices, and the lateral damping device 180 can be selected from a lateral damper, a lateral hydraulic damper, and other devices, which is not limited in the present application.

Figure 5:
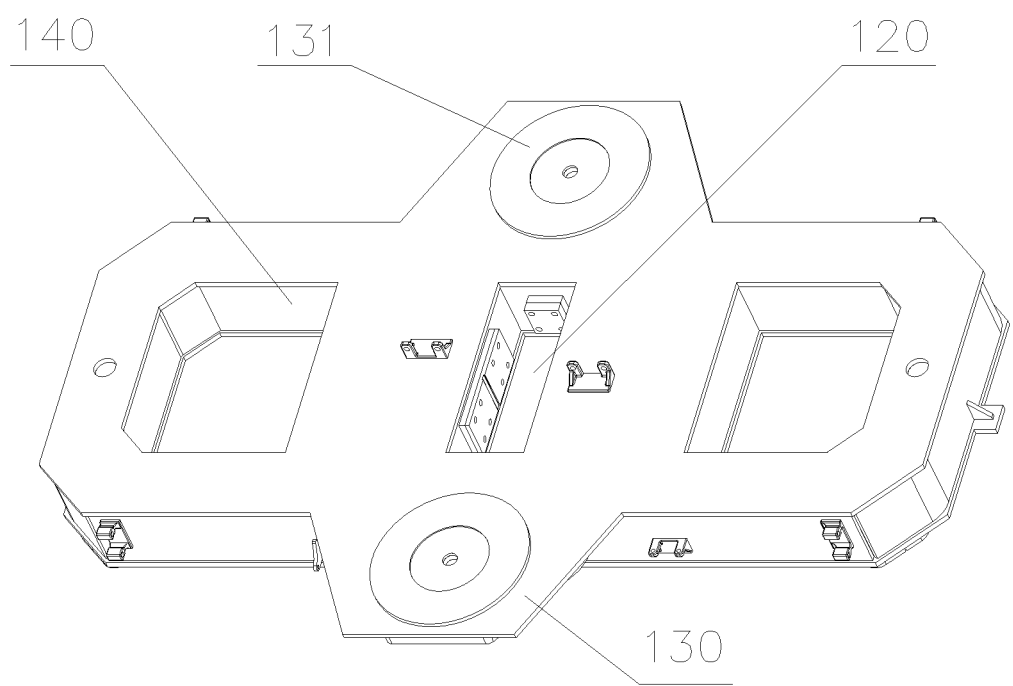
FIG. 5 is a scale drawing of a top view of an upper frame in the present application.
Figure 9:
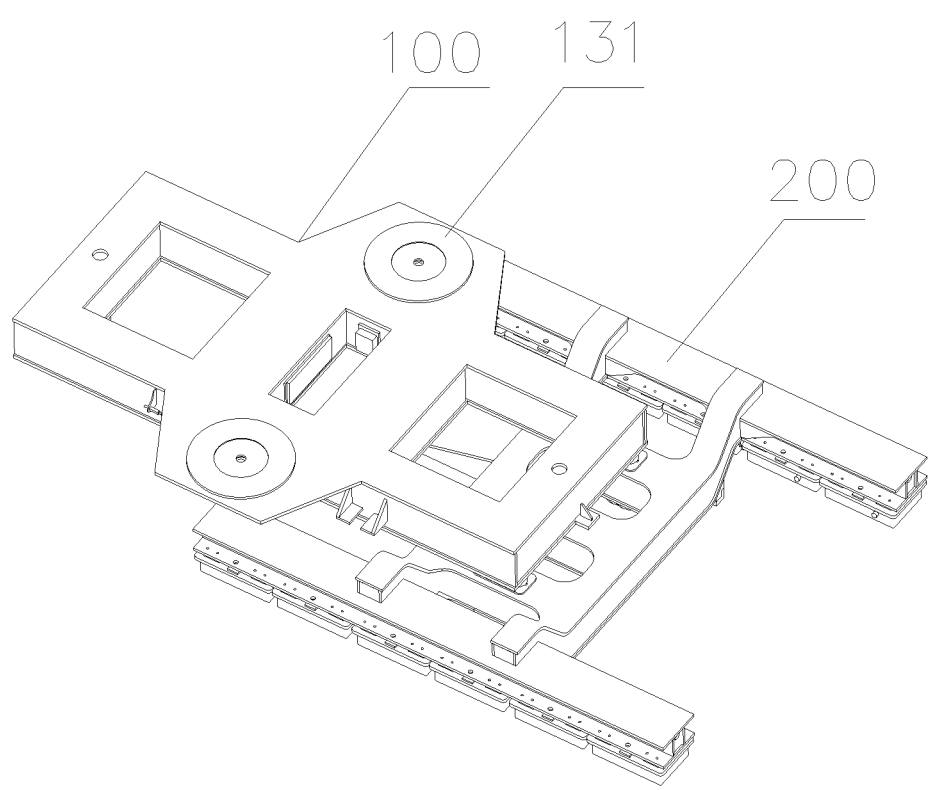
FIG. 9 is a scale drawing of an assembly drawing of the upper frame and the lower frame in the present application.

A mounting hole slot 120 is formed in the middle of the upper frame 100. The mounting hole slot 120 can be used for mounting a traction mechanism 160. The traction mechanism 160 is used for connecting a magnetic suspension train body and the bogie. Specifically, in some embodiments, the mounting hole slot 120 is square; one end of the traction mechanism 160 is installed on the inner wall of the mounting hole slot 120, and the other end of the traction mechanism is connected to the bottom of the car body. As illustrated in FIG. 5 and FIG. 9, two sides of the upper frame 100 respectively extend outward to form a mounting part 130, on which an air spring mounting base 131 is provided. The air spring 600 is mounted on the air spring mounting base 131, and is connected to the bottom surface of the car body, so as to adjust the height of the car, and to assist in reducing vertical vibration.

There are usually two bogies under a car of the magnetic suspension train, and there are four air springs 600 for supporting the car body. The front end and rear end of the upper frame 100 are mounted on the corresponding lower frame 200 by means of the connection device 500 respectively, and vertical connection and steering between the upper frame and the lower frame 200 is realized by the connection device 500.

Preferably, the upper frame 100 may be a beam structure in the shape of Chinese character "目", that is, the front side and rear side of the mounting hole slot 120 of the upper frame 100 are respectively provided with a weight reducing hole slot 140. Two reducing hole slots 140 can reduce the weight of the upper frame 100, and provide more installation space for other structures. The shape of the weight reducing hole slot 140 is preferably square. The beam structure in the shape of Chinese character "目" can be formed by assembling and welding at least one of metal profiles, castings, forgings or metal plates, and connecting other light materials by rivets and bolts, which is not limited by the present application here.

Figure 2:
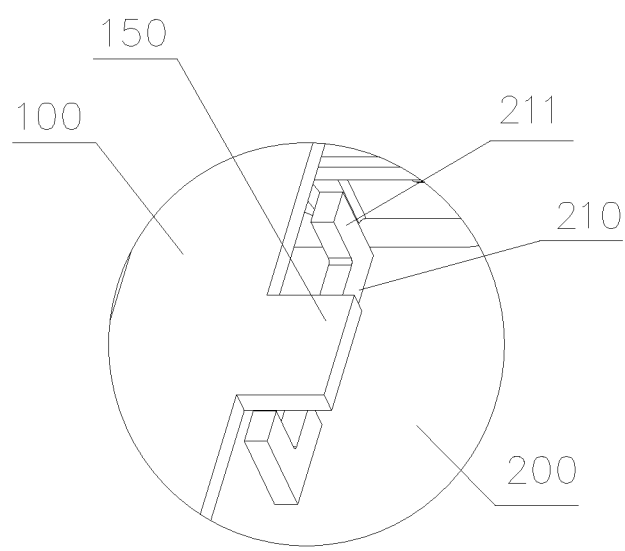
FIG. 2 is a scale drawing of a partial enlarged drawing of an area I in FIG. 1 of the present application.

As illustrated in FIG. 2, in order to further limit the steering scope of the upper frame 100, the front end and the rear end of the upper frame 100 are respectively provided with a steering stopper 150. The position, corresponding to the steering stopper 150, of the lower frame 200 is provided with a steering stopper base 210. The steering stopper base 210 is used for limiting the lateral displacement of the steering stopper 150. Specifically, the steering stopper 150 is a protuberance extending outwards. The bottom of the steering stopper base 210 is mounted on the lower frame 200. Two sides, at the steering stopper 150, of the steering stopper base 210 are respectively provided with a baffle 211. When the upper frame 100 rotates, the steering stopper 150 rotates therewith, then the baffles 211 at two sides of the steering stopper base 210 limit the rotation scope of the steering stopper 150, thereby further ensuring the stability of the upper frame 100 in an operating process.

Figure 8:
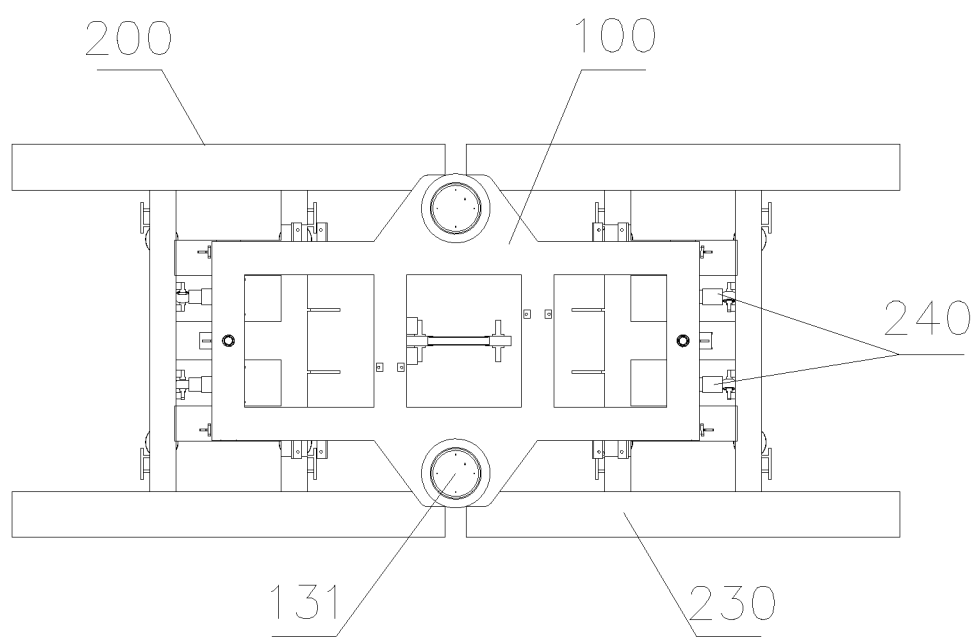
FIG. 8 is a scale drawing of a top view of the upper frame in the present application.

As illustrated in FIG. 8, an anti-yaw damper 240 is provided between the upper frame 100 and the lower frame 200. The anti-yaw damper 240 effectively reduces an anti-yaw movement between the upper frame 100 and the lower frame 200, so that the train runs more stably.

The lower frame 200 includes a beam 220 and two side beams 230 which are symmetrically provided at two sides of the beam 220. The suspension device 300 is provided at the bottom of the side beam 230. A track sensing device 400 is provided on the bottom surface of the middle of the beam 220. Specifically, the side beams 230 and the beam 220 from the basic structure of the lower frame 200. The side beams 230 and the beam 220 are connected as an integral one. Preferably, two side edges of the beam 220 extend outward to form a lap joint part 221. The lap joint part 221 is fixed on the side beam 230, which further enhances connection strength between the side beam 230 and the beam 220. Optionally, there can be a plurality of lap joint parts 221. The plurality of lap joint parts 221 are provided on the side beam 230 at intervals, which contributes to reducing the use of materials and reducing the whole weight of the bogie while enhancing the connection strength.

Figure 10:
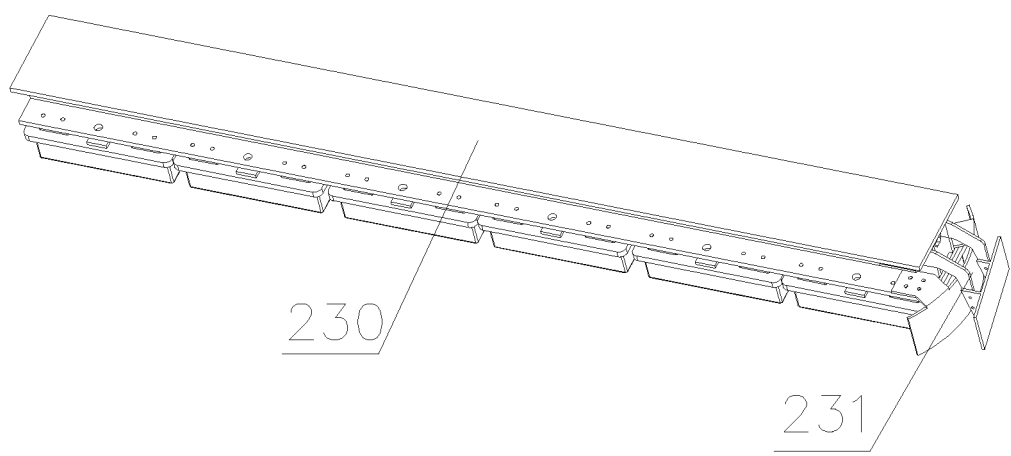
FIG. 10 is a scale drawing of a side beam in the present application.

In some specific embodiments, outer side face and upper surface of the side beam 230 may be mounted with low-temperature liquid filling pipes (not marked in the drawings), and these tubular pipes contributes to replacing the low-temperature cooling liquid in the container during installation or maintenance. A mounting interface (not marked in the drawings) of a brake system is provided on the side beam 230. As illustrated in FIG. 10, end face of at least the front end or rear end of the side beam 230 is provided with a mounting interface (not marked in the drawings) of a cowcatcher 231.

Figure 4:
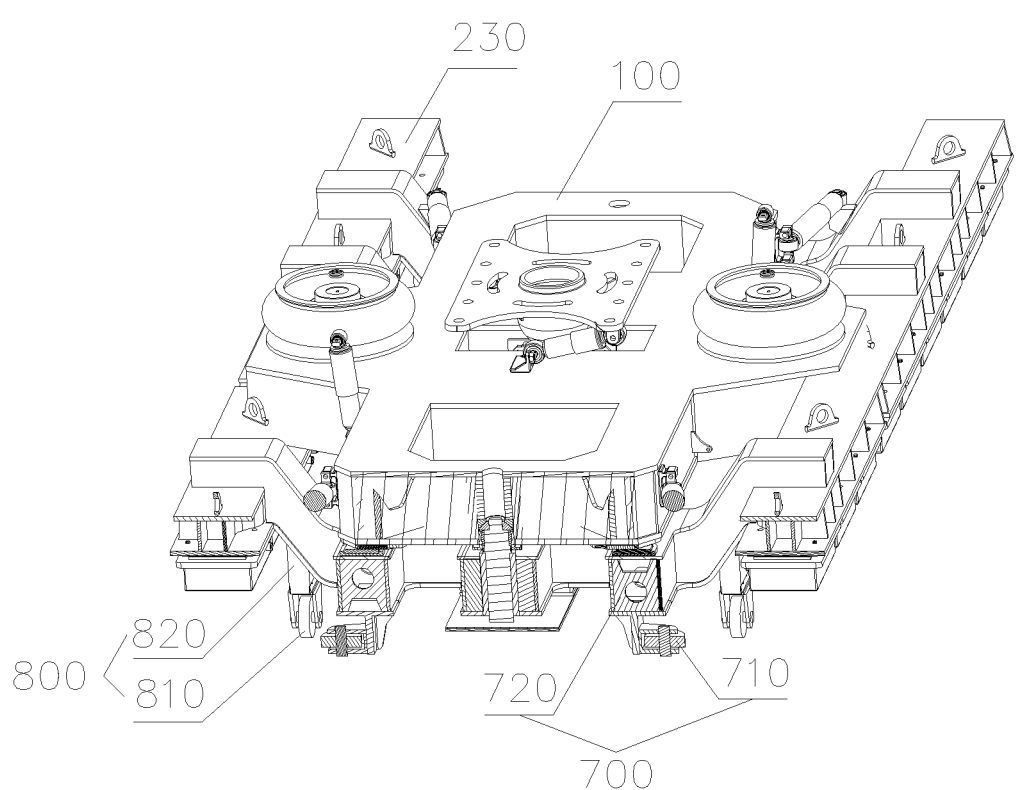
FIG. 4 is a scale drawing of a part sectioned view in the present application.
Figure 12:
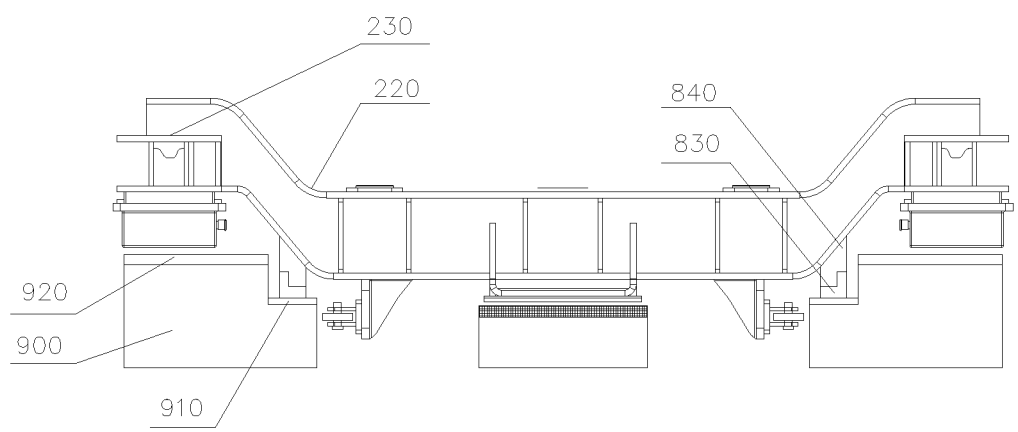
FIG. 12 is a scale drawing of mounting the lower frame on a track in the present application.

As illustrated in FIG. 4 and FIG. 12, in a specific embodiment of the present application, the bottoms of two sides of the beam 220 are respectively provided with guide devices 700. The guide device 700 includes a guide wheel 710 and a guide wheel carrier 720. The guide wheel 710 is laterally provided. The guide wheel 710 is mounted on the beam 220 by means of the guide wheel carrier 720. The guide wheel 710 comes into contact with the inner wall of a track 900. The guide wheels 710 at two sides of the lower frame 200 realizes a lateral constraint limit of the bogie relative to the track 900 by contacting with the inner side face of the track 900, thereby implementing a function of mechanically guiding the bogie.

Support devices 800 are respectively provided at the bottoms of two sides of the beam 220. The support device 800 corresponds to the top surface of the track 900, and is used for supporting the bogie when the bogie is in a non-suspension state.

Specifically, in an embodiment of the present application, support devices 800 are respectively provided at the bottoms of two sides of the beam 220. The support device 800 includes a support wheel 810 and a support wheel carrier 820. The support wheel 810 is provided vertically, and is mounted on the beam 220 by means of the support wheel carrier 820. The support wheel 810 corresponds to the top surface of the track 900. When the bogie is in a suspension state, the support wheel 810 does not contact with the top surface of the track 900. When the bogie is in a non-suspension state, the support wheel 810 contacts with the top surface of the track 900 to support the bogie. It is to be noted that the top surface of the track 900 includes two parts, namely a support top surface 910 on the inside and a suspension top surface 920 on the outside. The support top surface 910 corresponds to the support device 800. The suspension top surface 920 corresponds to the suspension device 300 of the side beam 230. The vertical height of the suspension top surface 920 is greater than that of the support top surface 910. When the bogie is in the non-suspension state, there is still a certain spacing between the suspension device 300 and the suspension top surface 920. Setting the spacing effectively prevents the suspension device 300 from contacting with the suspension top surface 920 to cause damage during a falling process of the bogie.

In another embodiment, support devices 800 are respectively provided at the bottoms of two sides of the beam 220. The support device 800 includes a vertical skid 830 which is provided laterally and a skid bracket 840. The vertical skid 830 is mounted on the beam 220 by means of the skid bracket 840. The support device 800 is located between the guide device 700 and the side beam 230.

Figure 6:
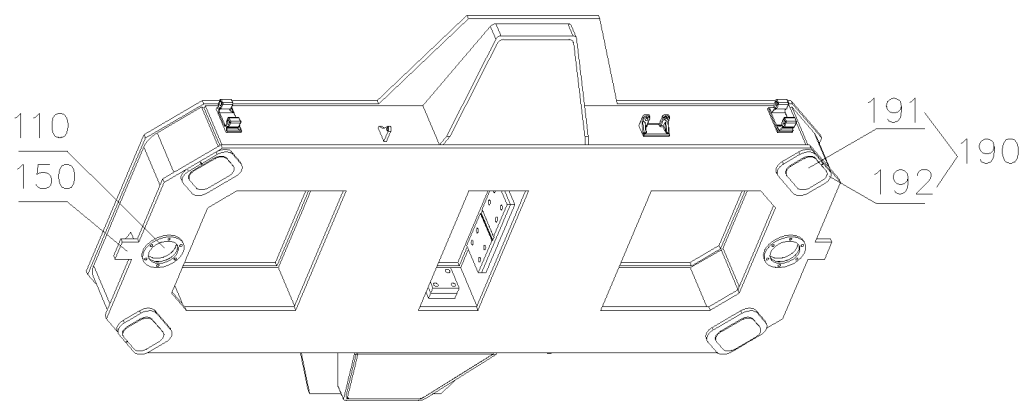
FIG. 6 is a scale drawing of a bottom view of the upper frame in the present application.
Figure 7:
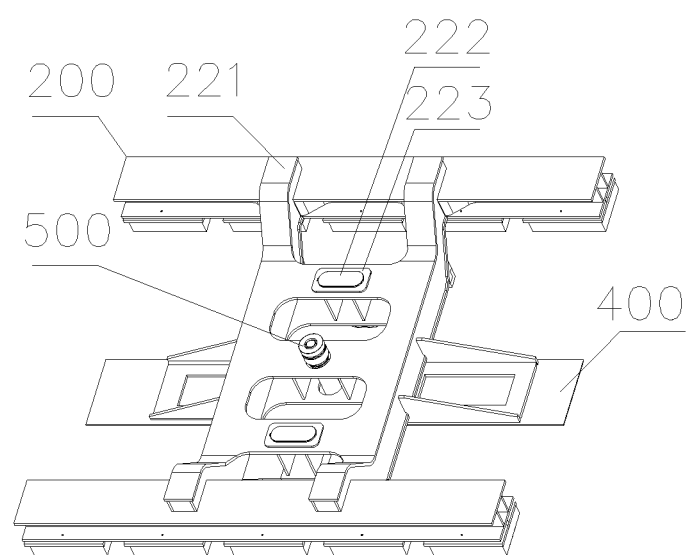
FIG. 7 is a scale drawing of a top view of a lower frame in the present application.

As illustrated in FIG. 6 and FIG. 7, the connection device 500 is provided in the middle of the beam 220. Wearing plates 222 are respectively provided at two sides of the connection device 500 on the beam 220. The wearing plate 222 is mounted on a wearing plate mounting base 223, and the wearing plate mounting base 223 is mounted on the beam 220. A contact side bearing set 190 is provided at the position, corresponding to the wearing plate 222, on the bottom surface of the upper frame 100. The contact side bearing set 190 is used for supporting the upper frame 100.

In a specific embodiment, as illustrated in FIG. 6, the contact side bearing set 190 includes a steering friction block 191 and a steering friction block mounting base 192. The steering friction block mounting base 192 is mounted on the upper frame 100, and the steering friction block 191 is mounted on the steering friction block mounting base 192.

The present application further relates to a magnetic suspension train. The train includes a plurality of compartments and the bogie. The magnetic suspension bogie is mounted at the bottom of the compartment. Generally, there are two bogies arranged under a magnetic suspension train. The two bogies are connected to the compartment by means of a hanging device.

To sum up, the present application has the beneficial effects as follows: the magnetic suspension bogie of the present application has basic functions of suspension drive and guidance of a magnetic suspension car; by using a bearing hinge structure to connect the upper frame 100 and the lower frames 200, it is not necessary to specifically provide a separate steering mechanism, which simplifies the structure while providing a plurality of functions; because there are a few parts, and the parts are made of light material, the weight of a walking mechanism of a superconducting magnetic suspension car can be reduced effectively; and a low-temperature liquid filling system is usually arranged on the ground under the car, thus it is beneficial to mounting a larger number of low-temperate containers in the walking mechanism and bogie to contain more low-temperature liquid, and then more suspension force can be realized.

By arranging a track sensing device 400 traction motor on the track 900 under the car, the weight of the walking mechanism is reduced, and it is easy to extend a design scope of the power of the traction motor, so that the magnetic suspension car running at a higher speed (above 500 km/h) can be realized.

In the description of the application, it is to be understood that orientation or position relationships indicated by terms "center", "longitudinal", "transverse", "length", "width", "thickness", "upper", "lower", "front", "back", "left", "right", "vertical", "horizontal", "top", "bottom", "inner", "outer" and the like are orientation or position relationships shown in the drawings, are adopted not to indicate or imply that indicated devices or components must be in specific orientations and structured and operated in specific orientations but only to conveniently describe the present application and simplify the description, and are not to be construed as limiting the present application.

In addition, terms "first" and "second" are only adopted for description and should not be understood to indicate or imply relative importance or to implicitly indicate the number of indicated technical features. Therefore, a feature defined by "first" and "second" may explicitly or implicitly indicate inclusion of at least one such feature. In the description of the present application, "multiple" means at least two, for example, two and three, unless otherwise limited definitely and specifically.

In the present application, unless otherwise definitely specified and limited, terms "mount", "mutually connect", "connect", "fix" and the like should be broadly understood. For example, the terms may refer to fixed connection and may also refer to detachable connection or integrated connection. The terms may refer to mechanical connection or electrical connection. The terms may refer to direct mutual connection, may also refer to indirect connection through a medium and may refer to communication in two components or an interaction relationship of the two components, unless otherwise definitely limited. For those of ordinary skill in the art, specific meanings of these terms in the present application can be understood according to a specific condition.

In the present application, unless otherwise definitely specified and limited, the state that a first feature is "above" or "below" a second feature may include that the first feature and the second feature directly contact and may also include that the first feature and the second feature indirectly contact through a medium. Moreover, the state that the first feature is "over", "above" and "on" the second feature may represent that the first feature is just above or obliquely above the second feature or may only represent that a horizontal height of the first feature is larger than that of the second feature. The state that the first feature is "under", "below", and "beneath" the second feature may represent that the first feature is just below or obliquely below the second feature or may only represent that the horizontal height of the first feature is smaller than that of the second feature.

In the description of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the application. In the specification, these terms are not always schematically expressed for the same embodiment or example. Moreover, the specific described features, structures, materials or characteristics may be combined in a proper manner in any one or more embodiments or examples. In addition, those skilled in the art may integrate and combine different embodiments or examples described in the specification and features of different embodiments or examples without conflicts.

The above is only the preferred embodiment of the present application and not intended to limit the present application. Any modifications, equivalent replacements, improvements and the like made within the spirit and principle of the present application shall fall within the scope of protection of the disclosure.

The invention claimed is:

1. A magnetic suspension bogie, comprising: an upper frame located at an upper portion and two lower frames located at a lower portion; the upper frame and the lower frames are hinged and connected by means of a connection device,
    wherein the connection device is a bearing hinge device; the bearing hinge device comprises a bearing set, a main shaft and a shaft baffle; the main shaft is provided vertically; the bearing set is provided on a top of the main shaft; a bottom of the main shaft is mounted on the lower frame; a bearing set mounting hole for mounting the bearing set is provided at a position, corresponding to the bearing hinge device, on a bottom of the upper frame; the shaft baffle is sleeved on the main shaft; and the shaft baffle is mounted on the upper frame by means of a fixing piece.

2. The magnetic suspension bogie of claim 1, wherein suspension devices are mounted at bottoms of two sides of the lower frame.

3. The magnetic suspension bogie of claim 1, wherein a track sensing device is mounted at a bottom surface of a middle of the lower frame.

4. The magnetic suspension bogie of claim 1, wherein the two lower frames are arranged in parallel; a front end and a rear end of the upper frame are respectively mounted on corresponding lower frame by means of the connection device.

5. The magnetic suspension bogie of claim 1, wherein a mounting hole slot is formed in a middle of the upper frame; the mounting hole slot is configured to mount a traction mechanism; the traction mechanism is configured to connect a magnetic suspension train body and the magnetic suspension bogie; two sides of the upper frame respectively extend outward to form a mounting part, on which an air spring mounting base is provided.

6. The magnetic suspension bogie of claim 1, wherein steering stoppers are respectively provided on two ends of the upper frame; a steering stopper base is provided at a position, corresponding to the steering stopper, of the lower frame; and the steering stopper base is configured to limit lateral displacement of the steering stopper.

7. The magnetic suspension bogie of claim 1, wherein the lower frame comprises a beam and two side beams which are symmetrically provided at two sides of the beam; the suspension device is provided at a bottom of the side beam; and the track sensing device is provided on a bottom surface of a middle of the beam.

8. The magnetic suspension bogie of claim 7, wherein guide devices are respectively provided at bottoms of two sides of the beam; the guide device comprises a guide wheel which is laterally provided and a guide wheel carrier; the guide wheel is mounted on the beam by means of the guide wheel carrier; and the guide wheel comes into contact with an inner wall of a track.

9. The magnetic suspension bogie of claim 7, wherein support devices are respectively provided at bottoms of two sides of the beam; the support device corresponds to a top surface of a track, and is configured to support the magnetic suspension bogie when the magnetic suspension bogie is in a non-suspension state.

10. The magnetic suspension bogie of claim 7, wherein the connection device is provided in the middle of the beam; wearing plates are respectively provided at two sides of the connection device on the beam; a contact side bearing set is provided at a position, corresponding to the wearing plate, on a bottom surface of the upper frame; and the contact side bearing set is configured to support the upper frame.

11. The magnetic suspension bogie of claim 10, wherein the contact side bearing set comprises a steering friction block and a steering friction block mounting base; the steering friction block mounting base is mounted on the upper frame, and the steering friction block is mounted on the steering friction block mounting base.

12. The magnetic suspension bogie of claim 2, wherein the suspension device comprises a low-temperature material container, low-temperature cooling liquid and a superconducting block; the low-temperature cooling liquid and the superconducting block are provided in the low-temperature material container; and the low-temperature material container is mounted on bottom surfaces at two sides of the lower frame.

13. The magnetic suspension bogie of claim 1, wherein an anti-yaw damper is mounted between the upper frame and the lower frame.

14. The magnetic suspension bogie of claim 1, wherein a vertical damping device and a lateral damping device are provided between the upper frame and the lower frame.

15. A magnetic suspension train, comprising: a plurality of compartments and a magnetic suspension bogie; the magnetic suspension bogie is mounted at a bottom of the compartment,
    the magnetic suspension bogie comprising an upper frame located at an upper portion and two lower frames located at a lower portion; the upper frame and the lower frames are hinged and connected by means of a connection device,
wherein the connection device is a bearing hinge device; the bearing hinge device comprises a bearing set, a main shaft and a shaft baffle; the main shaft is provided vertically; the bearing set is provided on a top of the main shaft; a bottom of the main shaft is mounted on the lower frame; a bearing set mounting hole for mounting the bearing set is provided at a position, corresponding to the bearing hinge device, on a bottom of the upper frame; the shaft baffle is sleeved on the main shaft; and the shaft baffle is mounted on the upper frame by means of a fixing piece.

16. The magnetic suspension bogie of claim 5, wherein a front side and a rear side of the mounting hole slot of the upper frame are respectively provided with a weight reducing hole slot, and a shape of the weight reducing hole slot is square.

17. The magnetic suspension bogie of claim 6, wherein the steering stopper is a protuberance extending outwards.

18. The magnetic suspension bogie of claim 7, wherein the side beams and the beam form a basic structure of the lower frame, and the side beams and the beam are connected as an integral one.

19. The magnetic suspension bogie of claim 7, wherein two side edges of the beam extend outward to form a lap joint part, which is fixed on the side beam.

* * * * *